(12) United States Patent
Wachtfogel et al.

(10) Patent No.: US 9,847,984 B2
(45) Date of Patent: Dec. 19, 2017

(54) SYSTEM FOR EFFICIENT GENERATION AND DISTRIBUTION OF CHALLENGE-RESPONSE PAIRS

(71) Applicant: NDS LIMITED, Staines Middlesex (GB)

(72) Inventors: David Wachtfogel, Jerusalem (IL); Andrew Sinton, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 226 days.

(21) Appl. No.: 14/773,388

(22) PCT Filed: Oct. 23, 2013

(86) PCT No.: PCT/IB2013/059564
§ 371 (c)(1),
(2) Date: Sep. 8, 2015

(87) PCT Pub. No.: WO2014/155163
PCT Pub. Date: Oct. 2, 2014

(65) Prior Publication Data
US 2016/0028709 A1    Jan. 28, 2016

(30) Foreign Application Priority Data
Mar. 24, 2013 (IL) .......................... 225479

(51) Int. Cl.
*H04L 9/32* (2006.01)
*H04L 29/06* (2006.01)
*H04L 9/08* (2006.01)

(52) U.S. Cl.
CPC ............ *H04L 63/08* (2013.01); *H04L 9/0866* (2013.01); *H04L 9/3278* (2013.01); *H04L 2209/24* (2013.01)

(58) Field of Classification Search
CPC ..... H04L 9/3278; H04L 9/3271; G11C 16/10; G11C 11/5642
See application file for complete search history.

(56) References Cited

U.S. PATENT DOCUMENTS 7,702,927 B2   4/2010   Devadas et al.
8,689,340 B2   4/2014   Mantin et al.
(Continued)

FOREIGN PATENT DOCUMENTS

EP   002326043   5/2011
EP   002456121   5/2012
(Continued)

OTHER PUBLICATIONS

International Search Report and Written Opinion, dated Oct. 2, 2014.

*Primary Examiner* — Ellen Tran
(74) *Attorney, Agent, or Firm* — Samuel M. Katz

(57) ABSTRACT

A method for implementing response function agnostic, challenge-response authentication on a CE device includes sharing a series of proxy responses to a series of authentication challenges with a service provider, receiving an associated actual response from an initialization phase response function for each of the authentication challenges, where at least one of the initialization phase response function and a parameter required for the initialization phase response function is withheld from the service provider, encrypting each of the proxy responses with its associated actual response, thereby generating a series of encrypted proxy responses, storing the encrypted proxy responses on the CE device, receiving one of the authentication challenges from the service provider, inputting the authentication challenge to an operation phase response generator on the CE device, where the operation phase response generator is configured with the same response function used by the
(Continued)

initialization phase response generator, and decrypting the proxy response from the encrypted proxy responses and results of the inputting, thereby producing the proxy response to the authentication challenge without sharing the at least one of the response function and a parameter required for the response function with the service provider. Related apparatus and methods are also described.

24 Claims, 3 Drawing Sheets

(56) References Cited

U.S. PATENT DOCUMENTS

| | | |
|---|---|---|
| 2009/0083833 A1 | 3/2009 | Ziola et al. |
| 2010/0177898 A1 | 7/2010 | Tuyls et al. |
| 2010/0272255 A1 | 10/2010 | Devadas et al. |
| 2011/0002461 A1 | 1/2011 | Erhart et al. |
| 2012/0204023 A1* | 8/2012 | Kuipers .................. G06F 21/10 713/150 |

FOREIGN PATENT DOCUMENTS

| | | | |
|---|---|---|---|
| NL | EP 2326043 A1 * | 5/2011 | ........... H04L 9/3234 |
| WO | WO2007063473 | 6/2007 | |
| WO | WO2011061116 | 5/2011 | |

* cited by examiner

SYSTEM FOR EFFICIENT GENERATION AND DISTRIBUTION OF CHALLENGE-RESPONSE PAIRS

The present application is a §371 submission of International Application No. PCT/IB2013/059564, which was filed on Oct. 23, 2013, which was published in the English language on Oct. 2, 2014 with publication number WO 2014/155163, and which claims the benefit of the filing date of IL 225479, filed Mar. 24, 2013.

FIELD OF THE INVENTION

The present invention relates in general to challenge-response pair based authentication for consumer electronic devices, and particularly, but not exclusively, to implementing such authentication in the absence of direct control of a device's response function.

BACKGROUND OF THE INVENTION

The following references are believed to represent the state of the art:
PCT Patent Publication WO2011061116 "Preventing Cloning of Receivers of Encrypted Messages", by Dekker;
U.S. patent application Ser. No. 12/084,852 "DISK PROTECTION SYSTEM" by Mantin et al;
U.S. Patent Publication 2011/0002461 "Method and System for Electronically Securing an Electronic Biometric Device Using Physically Unclonable Functions", by Erhart et al;
U.S. Patent Publication 2010/0272255 "Securely Field Configurable Device", by Devedas et al;
U.S. Patent Publication 2009/0083833 "Authentication with Physical Unclonable Functions", by Ziola et al; and
U.S. Patent Publication 2010/0177898 "Device and Method for Providing Authentication", by Tyuls et al.

SUMMARY OF THE INVENTION

There is provided, in accordance with embodiments of the present invention, a method for generating and storing challenge-response pairs for the authentication of a consumer electronics (CE) device, the method including sharing at least one challenge $K_{CHALLENGE-i}$ and a series of integers i with a service provider, sharing at least one proxy response $K_{IRD-i}$ with the service provider, where each of the $K_{IRD-i}$ is associated with one of the at least one $K_{CHALLENGE-i}$ according to the series of integers i, for each $K_{CHALLENGE-i}$, generating an associated $K_{RESPONSE-i}$ by inputting the $K_{CHALLENGE-i}$ to a response generator associated with the CE device, thereby producing one of the challenge-response pairs from each the $K_{CHALLENGE-i}$ and its generated associated $K_{RESPONSE-i}$, where at least one of the response function for the response generator and a parameter required for said response function is withheld from the service provider, for each of the associated $K_{RESPONSE-i}$, deriving $EK_{IRD-i}$ from both the associated $K_{RESPONSE-i}$ and the associated $K_{IRD-i}$, and storing each of the $EK_{IRD-i}$ on the CE device according to the series of integers i, where a given $K_{IRD-i}$ is derivable from the $K_{RESPONSE-i}$ received from the response generator in response to the $K_{CHALLENGE-i}$ paired with the $K_{IRD-i}$ and the $EK_{IRD-i}$ associated with the paired $K_{CHALLENGE-i}$.

Further, in accordance with embodiments of the present invention, the method also includes deriving the at least one challenge $K_{CHALLENGE-i}$ from meta-key $MK_{CHALLENGE}$ and the series of integers i, where the $MK_{CHALLENGE}$ is shared with the service provider, and deriving the at least one proxy response $K_{IRD-i}$ from meta-key $MK_{IRD}$ and the series of integers i, where the $MK_{IRD}$ is shared with the service provider.

Still further, in accordance with embodiments of the present invention, the meta-key $MK_{CHALLENGE}$ is common to more than one CE device.

Additionally, in accordance with embodiments of the present invention, the meta-key $MK_{IRD}$ is common to more than one CE device.

Moreover, in accordance with embodiments of the present invention, the meta-key $MK_{CHALLENGE}$ is equal to the $MK_{IRD}$ on the CE device, where the deriving at least one challenge $K_{CHALLENGE-i}$ uses a different algorithm than the deriving the at least one proxy response $K_{IRD-i}$.

Further, in accordance with embodiments of the present invention, the at least one $K_{CHALLENGE-i}$ includes at least two $K_{CHALLENGE-i}$ and the at least one $K_{IRD-i}$ includes at least two $K_{IRD-i}$.

Still further, in accordance with embodiments of the present invention, the storing each of the at least one $EK_{IRD-i}$ comprises storing each of the at least one $EK_{IRD-i}$ in non-volatile memory.

Additionally, in accordance with embodiments of the present invention, the response function used by the response generator is not shared with the manufacturer of the CE device.

Moreover, in accordance with embodiments of the present invention, the response generator uses a key-based computation, where the key used in the key-based computation is not shared with the service provider.

Further, in accordance with embodiments of the present invention, the response generator includes a physically unclonable function (PUF) device.

Still further, in accordance with embodiments of the present invention, the method also includes receiving $RK_{CHALLENGE-i}$ and Ri from the service provider, where the $RK_{CHALLENGE-i}$ is equal to one of the at least one $K_{CHALLENGE-i}$ and Ri is equal to one of the series of integers i associated with the one of at least one $K_{CHALLENGE-i}$, inputting $RK_{CHALLENGE-i}$ to an operation phase response generator, receiving $RK_{RESPONSE-i}$ from the operation phase response generator in response to the inputting, deriving unencrypted $UK_{IRD-i}$ from the $RK_{RESPONSE-i}$ and the $EK_{IRD-i}$, where the $EK_{IRD-i}$ is associated with the Ri, and returning the $UK_{IRD-i}$ to the service provider in response to the $RK_{CHALLENGE-i}$, thereby authenticating the CE device.

There is also provided, in accordance with embodiments of the present invention, a method for decrypting media on a consumer electronics (CE) device, the method including sharing at least one challenge $K_{CHALLENGE-i}$ and a series of integers i with a media provider, sharing at least one proxy response $K_{IRD-i}$ with the media provider, where each of the at least one $K_{IRD-i}$ is associated with one of the at least one $K_{CHALLENGE-i}$ according to the series of integers i, generating an associated $K_{RESPONSE-i}$ by inputting the $K_{CHALLENGE-i}$ to an initialization phase response generator associated with the CE device for each $K_{CHALLENGE-i}$, where at least one of the response function for the initialization phase response generator and a parameter required for the initialization phase response generator is withheld from the service provider, deriving $EK_{IRD-i}$ from both the associated $K_{RESPONSE-i}$ and the associated $K_{IRD-i}$ for each of the $K_{RESPONSE-i}$, storing each of the $EK_{IRD-i}$ on the CE device according to the series of integers i, receiving encrypted media, received challenge $RK_{CHALLENGE-i}$ and Ri from the media provider, where the $RK_{CHALLENGE-i}$ is equal to one of the at least one $K_{CHALLENGE-i}$ derived from the meta-key $MK_{CHALLENGE}$ and Ri is equal to one of the series of integers i associated with the one of at least one $K_{CHALLENGE-i}$, generating $RK_{RESPONSE-i}$ by inputting the $RK_{CHALLENGE-i}$ to an operation phase response generator on the CE device, where the operation phase response generator is configured with the same response function as the initialization phase response generator, deriving unencrypted $UK_{IRD-i}$ from the $RK_{RESPONSE-i}$ and the $EK_{IRD-i}$, where the i associated with $EK_{IRD-i}$ equals Ri, and using $UK_{IRD-i}$ to decrypt the encrypted media.

Further, in accordance with embodiments of the present invention, the using includes decrypting the encrypted media with $UK_{IRD-i}$, where the encrypted media is encrypted with the $K_{IRD-i}$ associated with the $K_{CHALLENGE-i}$.

Still further, in accordance with embodiments of the present invention, the using includes deriving a decryption key from $UK_{IRD-i}$, where the $K_{IRD-i}$ associated with the $K_{CHALLENGE-i}$ was used to secure the encryption key, and decrypting the encrypted media with the encryption key, where the encrypted media is encrypted with the encryption key.

There is also provided, in accordance with embodiments of the present invention, a method for implementing response function agnostic, challenge-response authentication on a CE device includes sharing a series of proxy responses to a series of authentication challenges with a service provider, receiving an actual response from an initialization phase response function for each of the series of authentication challenges, thereby generating a series of associated actual responses, where at least one of the initialization phase response function and a parameter required for the initialization phase response function is withheld from the service provider, encrypting each of the series of the proxy responses with its associated actual response, thereby generating a series of encrypted proxy responses, storing the series of encrypted proxy responses on the CE device, receiving one of the series of authentication challenges from the service provider, inputting the one of the series of authentication challenges to an operation phase response generator on the CE device, where the operation phase response generator is configured with the same response function used by the initialization phase response generator, and decrypting an associated proxy response from the series of encrypted proxy responses and results of the inputting, thereby producing the proxy response to an associated authentication challenge without sharing at least one of the response function and a parameter required for the response function with the service provider.

There is also provided, in accordance with embodiments of the present invention, a challenge-response pair generator, implementable on a computing device, including a response generator configured with a response function for generating responses to a series of challenges $K_{CHALLENGE-i}$, where each of the series of $K_{CHALLENGE-i}$ is associated with a series of proxy responses $K_{IRD-i}$ according to the series of integers i, where both the series of $K_{CHALLENGE-i}$ and $K_{IRD-i}$ are shared with a service provider, and an encryption module configured to at least encrypt the responses to the series of $K_{CHALLENGE-i}$ with the $K_{IRD-i}$, where the series of $K_{IRD-i}$ is derivable from the generated responses and the encrypted responses, thereby facilitating receipt of one of the series of $K_{IRD-i}$ in response to an associated $K_{CHALLENGE-i}$ issued by the service provider through use of the response function, where the use does not require sharing of at least one of the response function and a parameter required for the response function with the service provider.

Further, in accordance with embodiments of the present invention, the challenge-response pair generator includes a key generator configured to generate at least the series of $K_{CHALLENGE-i}$ from a meta-key $MK_{CHALLENGE}$ and the series of $K_{IRD-i}$ from meta-key $MK_{IRD}$, where the meta-keys are shared with a service provider.

Still further, in accordance with embodiments of the present invention, the challenge-response pair generator also includes an authentication storage unit configured to at least store the series of proxy responses $K_{IRD-i}$ according to the series of integers i.

There is also provided, in accordance with embodiments of the present invention, an authentication system for a consumer electronics (CE) device including an authentication storage unit configured to store at least a series of encrypted responses, where each of the encrypted responses are derived from a proxy response and an actual response to an authentication challenge from a service provider, where the proxy responses and authentication challenges are shared with the service provider, an I/O module configured to at least receive the authentication challenges from the service provider, a response function configured to provide the actual responses to the authentication challenges, where at least one of the response function and a parameter required for the response function is withheld from the service provider, and a challenge responder configured to employ a decryption module to use the provided actual responses to decrypt the encrypted responses, thereby facilitating derivation of the proxy response for an associated received the authentication challenge from the service provider.

Further, in accordance with embodiments of the present invention, the authentication system is implemented in a smart card.

Still further, in accordance with embodiments of the present invention, the I/O module is further configured to return the proxy response to the service provider to authenticate the CE device.

Additionally, in accordance with embodiments of the present invention, the I/O module is further configured to receive encrypted media from the service provider, where the encrypted media is encrypted with one of the proxy responses, and the decryption module is configured to decrypt the encrypted media using the one of the proxy responses.

Moreover, in accordance with embodiments of the present invention, each of series of encrypted responses are associated with a series of i, and the I/O module is further configured to receive one of the series of integers i along with the authentication challenge from the service provider, thereby indicating which of the encrypted responses is associated with a given received the authentication challenge.

There is also provided, in accordance with embodiments of the present invention, a challenge-response pair generator, implementable on a computing device, means for generating associated responses to a series of $K_{CHALLENGE-i}$, where each of the series of $K_{CHALLENGE-i}$ is associated with a series of proxy responses $K_{IRD-i}$ according to the series of integers i, where both the series of $K_{CHALLENGE-i}$ and $K_{IRD-i}$ are shared with a service provider, and means for encrypting the associated responses to the series of $K_{CHALLENGE-i}$, where the series of $K_{IRD-i}$ is derivable from the generated associated responses and the encrypted associated responses, thereby facilitating receipt of one of the series of $K_{IRD-i}$ in response to an associated $K_{CHALLENGE-i}$ issued by the service provider through use of the means for generating responses, where the use does not require sharing of the means for generating responses with the service provider.

There is also provided, in accordance with embodiments of the present invention, an authentication system for a consumer electronics (CE) device including means for storing at least a series of encrypted responses, where each of the encrypted responses are derived from a proxy response and an associated actual response to an authentication challenge from a service provider, where the proxy responses are shared with the service provider, means for receiving the authentication challenges from the service provider, means for generating the associated actual responses to the authentication challenges, where at least one of a response function used for the generating and a parameter required for the response function is withheld from the service provider, and means for employing a decryption module to use the provided associated actual responses to decrypt the encrypted responses, thereby facilitating derivation of the proxy response for an associated received authentication challenge from the service provider.

There is also provided, in accordance with embodiments of the present invention, a response function agnostic CE device challenge-response authentication system including means for sharing a series of proxy responses to a series of authentication challenges with a service provider, means for receiving an actual response from an initialization phase response function for each of the series of authentication challenges, thereby generating a series of associated actual responses, where at least one of the initialization phase response function and a parameter required for the response function is withheld from the service provider, means for encrypting each of the series of proxy responses with its associated actual response, thereby generating a series of encrypted proxy responses, means for storing the series of encrypted nominal responses on the CE device, means for receiving one of the series of authentication challenges from the service provider, means for inputting the one of the series of authentication challenges to an operation phase response generator on the CE device, where the operation phase response generator is configured with the same response function used by the initialization phase response generator, and means for decrypting an associated proxy response from the series of encrypted proxy responses and results of the inputting, thereby producing the proxy response to an associated authentication challenge without sharing at least one of the response function and a parameter required for the response function with the service provider.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
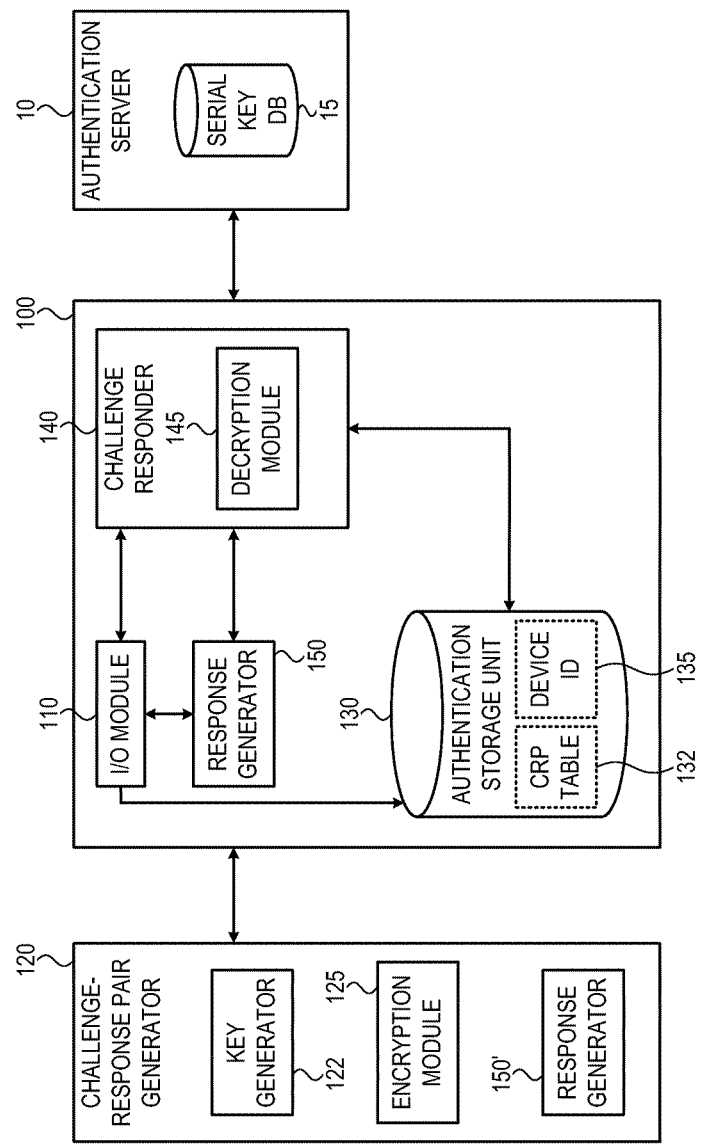
FIG. 1 is a schematic illustration of a CE device, constructed and operative in accordance with an embodiment of the present invention.

The terms "scrambled" and "encrypted", in all of their grammatical forms, are used interchangeably throughout the present specification and claims to refer to any appropriate scrambling and/or encryption methods for scrambling and/or encrypting data, and/or any other appropriate method for intending to make data unintelligible except to an authorized entity. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Consumer electronic (CE) devices, such as, for example, set-top boxes, personal computers, tablets, handheld communications devices and the like, may typically be entitled to various services based on agreements with service providers. In order to receive such services, the CE devices may be required to provide identifying information to authentication servers associated with the service providers. The authentication servers may use challenge-response pairs as a means for authentication. In such a scenario, an authentication server may send a "challenge" to the CE, which may then respond with a "response." If the received response matches an expected response for the issued challenge, the server may authenticate the identity of the device. Typically, multiple challenge-response pairs are generated to facilitate periodic switching or fallbacks in the event that a given pair is compromised.

Such challenge-response pairs may typically be generated prior to distribution of the CE device by inputting a challenge to a response function associated with the CE device. Such a response function may be, for example, a key-based computation that may generate a seemingly unpredictable, yet consistent, response to a given challenge. Alternatively, the response function may be a hardware-based physical unclonable function (PUF). The generation process may typically be performed on the CE device itself. However, if the device's response function may be reproduced, it may be performed elsewhere on any other suitable platform, such as a standard computer or a specialized device. Once generated, copies of the challenges and their associated responses for each device and/or groups of devices may be stored on the authentication server.

The authentication server may then use the stored challenge-response pairs to authenticate subsequent communications with the CE device. As per the scenario disclosed hereinabove, the authentication server may send a challenge to the CE device. The CE device may then use its response function to generate a response which may then be returned to the authentication server. The authentication server may then authenticate the CE device if the returned response received from the device matches the associated response stored on the authentication server.

It will be appreciated that the device manufacturer and the service provider operating the authenticating server may be different entities that may be required to cooperate in order to generate and store the challenge-response pairs for use by the authentication server. In some cases it may be problematic for the device manufacturer to provide the response function to the service provider. For example, if the response functions are PUFs, it may not be feasible to reproduce them for use by the authentication server. Similarly, there may be business/legal considerations that may preclude the manufacturer from providing the service provider with the details of key-based response functions. For example, some manufacturers may simply prefer to keep the response function a secret from their customers, i.e. the service provider, and may therefore refuse to share the details of the response function.

In such cases the pair generation process may therefore only be performed using the device itself. While the service provider may theoretically process each of the devices to generate the challenge-response pairs, such an undertaking may add further expense and/or complexity to the process, and in any case may require the service provider to take physical possession of the devices prior to their distribution to end users. Accordingly, it may be beneficial for the manufacturer to generate the pairs and forward the resulting list of challenge-response pairs to the service provider. Unfortunately, oftentimes device manufacturers may not be relied upon to deliver such a list without error.

The inventors of the present invention have realized that challenge-response pair based security may be implemented on a CE device by a manufacturer without actually sharing the list of challenge-response pairs with the service provider. Instead, as may be described in detail hereinbelow, the responses may be used to encrypt security information provided by the security operator, thereby facilitating a "response function agnostic" version of a challenge-response pair based security system. As will be described hereinbelow, in such a response function agnostic security system, the "challenger", i.e. the service provider of the previous example, may effectively authenticate a response to a challenge, even without knowledge of the response function used by the responder, i.e. the CE device, to generate the response to the challenge.

Reference is now made to FIG. 1 which illustrates a CE device 100, constructed and operative in accordance with an embodiment of the present invention to facilitate the generation of challenge-response pairs for use by a non-manufacturer entity that does not possess the details of the response function in use for CE device 100. CE device 100 may comprise I/O module 110, device storage unit 130, challenge responder 140 and challenge generator 150.

CE device 100 may be configured to communicate with authentication server 10 and challenge-response pair generator 120 via I/O module 110. Challenge-response pair generator 120 may typically be associated with the manufacturer of CE device 100, whereas authentication server 10 may typically be associated with a service provider requiring authentication of CE device 100. For example, the service provider may provide television programming services. In such a case, authentication server 10 may be implemented as part of a television headend. It will be appreciated that the service provider may alternatively, or additionally, provide other services, such as, for example, telephony, radio, music content, text messages and the like.

It will be appreciated that CE device 100 may also comprise additional functionality as required for its intended commercial purpose. For example, CE device 100 may be a set-top box, personal computer, tablet or handheld communications device that may receive services from the operator of authentication server 10. However, in the interests of clarity, the additional functionality required to receive such services may not be depicted in FIG. 1. Alternatively, CE device 100 may be configured as an accessory element that may be dedicated to providing authentication functionality vis-à-vis authentication server 10. For example, CE device 100 may be configured as a smartcard or any other software/hardware module designed to provide authentication services vis-à-vis authentication server 10.

Figure 2:
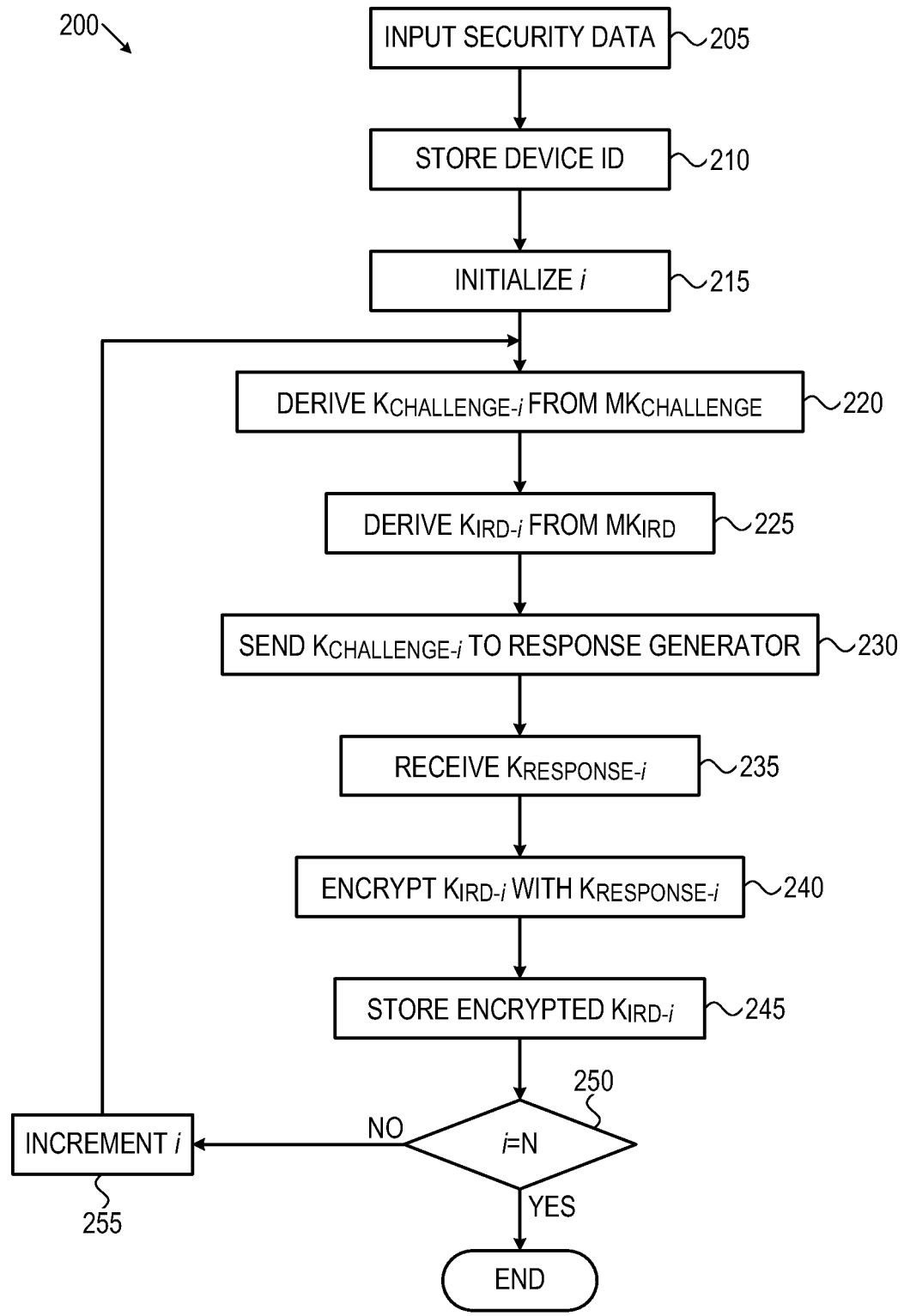
FIG. 2 is a block diagram of a challenge-response pair process that may be performed to generate one or more challenge-response pairs for the CE device of FIG. 1.

Challenge-response pair generator 120 may comprise key generator 122 and encryption module 125. Reference is now made also to FIG. 2 which illustrates a challenge-response pair process 200 that may be performed by challenge-response pair generator 120 to generate one or more challenge-response pairs for CE device 100. Challenge-response pair generator 120 may input (step 205) authentication data into CE device 100 via I/O module 110. Such authentication data may be received from the service provider operating authentication server 10 prior to the start of process 200. As may be discussed hereinbelow, a copy of the authentication data may be stored in serial key database 15 on authentication server 10. The authentication data may include a device ID for CE device 100, which challenge-response pair generator 120 may store as device ID 135 in authentication storage unit 130. Authentication storage unit 130 may be implemented using any suitable means, such as, for example, flash memory, thereby providing a measure of protection against modification by unauthorized parties.

The authentication data may also include a challenge meta-key ($MK_{CHALLENGE}$) and a response meta-key ($MK_{IRD}$). Together, $MK_{CHALLENGE}$ and $MK_{IRD}$ may be suitable for deriving a set of one or more challenge-response pairs per one or more algorithms agreed upon by the operators of authentication server 10 and Challenge-response pair generator 120. $MK_{CHALLENGE}$ may be suitable for deriving a series of challenges $K_{CHALLENGE}$ according to one or more algorithms known to both the operators of authentication server 10 and challenge-response pair generator 120. For example, for a series of i=1 to N challenge-response pairs, key generator 122 may initialize (step 215) i according to an agreed upon algorithm.

Key generator 122 may then derive (step 220) $K_{CHALLENGE-i}$ from a combination of $MK_{CHALLENGE}$ and i. For example, key generator 125 may employ encryption module 125 to encrypt $MK_{CHALLENGE}$ with i using AES or any other suitable encryption algorithm. Key generator 125 may also derive (step 225) $K_{IRD-i}$ from $MK_{IRD}$ and i in similar manner. It will be appreciated that other methods may also be used to derive $K_{CHALLENGE-i}$ and/or $K_{IRD-i}$. For example, the authentication data provided by the service provider may include a list of random numbers to populate series of one or more $K_{CHALLENGE-i}$ and/or $K_{IRD-i}$. In such a case it may therefore not be necessary to perform steps 220 and 225. It will be appreciated, however, that whichever method may be used to derive $K_{IRD-i}$, it may not be in any case directly derivable from $K_{CHALLENGE-i}$. Therefore, with respect to $K_{CHALLENGE-i}$, $K_{IRD-i}$ may not be an actual "response" but rather may be arbitrarily assigned. However, as will be discussed hereinbelow, $K_{IRD-i}$ may serve as a proxy for an actual response to $K_{CHALLENGE-i}$.

Challenge-response pairs generator 120 may send (step 230) the derived $K_{CHALLENGE-i}$ to response generator 150. Response generator 150 may be a response function employing a key-based computation. Alternatively, response generator 150 may employ a hardware-based response function, such as, for example, a PUF.

It will be appreciated that depending on the response function used for response generator 150, it may be feasible to configure challenge-response pair generator 120 with a similar function, suitable for use with multiple CE devices 100. For example, the response function may employ a generally reproducible key-based computation. In such cases, challenge-response pair generator 120 may also comprise response generator 150' which may be used to generate a response to $K_{CHALLENGE-i}$ instead of response generator 150.

Challenge-response pair generator 120 may receive (step 235) $K_{RESPONSE-i}$ as the response from response generator 150. Encryption module 125 may then encrypt (step 240) $K_{IRD-i}$ with $K_{RESPONSE-i}$, yielding $EK_{IRD-i}$. Challenge-response pair generator 120 may store (step 245) $EK_{IRD-i}$ in challenge-response pair table 132 in authentication storage unit 130 along with its associated i.

If i=N (step 250), process 200 may end. Otherwise, i may be incremented (step 255) and the process flow may return to step 220 where the next $K_{CHALLENGE-i}$ in series N may be derived.

Upon completion of process 200, a set of N challenge-response pairs may be stored in challenge-response pairs table 132, each comprising an $EK_{IRD-i}$ and its associated i. It will be appreciated that each $K_{CHALLENGE-i}$ and $K_{IRD-i}$ may be derivable by the service provider according to the copy of $MK_{CHALLENGE}$ stored in serial key database 15. However, since the response function used by response generator 150 may not be known to the service provider, an associated $EK_{IRD-i}$ may not be derivable by the service provider.

It will be appreciated that in some cases the response function per se may be shared with the service provider. For example, the response function used for generating $K_{RESPONSE-i}$ may be a well-known encryption algorithm to encrypt a key. Non-limiting examples of such well-known encryption algorithms may include AES, DES or 3DES. In such a case, the response function per se, i.e. which encryption algorithm was used, may be shared with the service provider. However, a necessary parameter such as the key used by the encryption algorithm may still be withheld from the service provider. Accordingly, the service provider may still not be able to derive $EK_{IRD-i}$ from $K_{CHALLENGE-i}$ and $K_{IRD-i}$ even if the response function is known.

Figure 3:
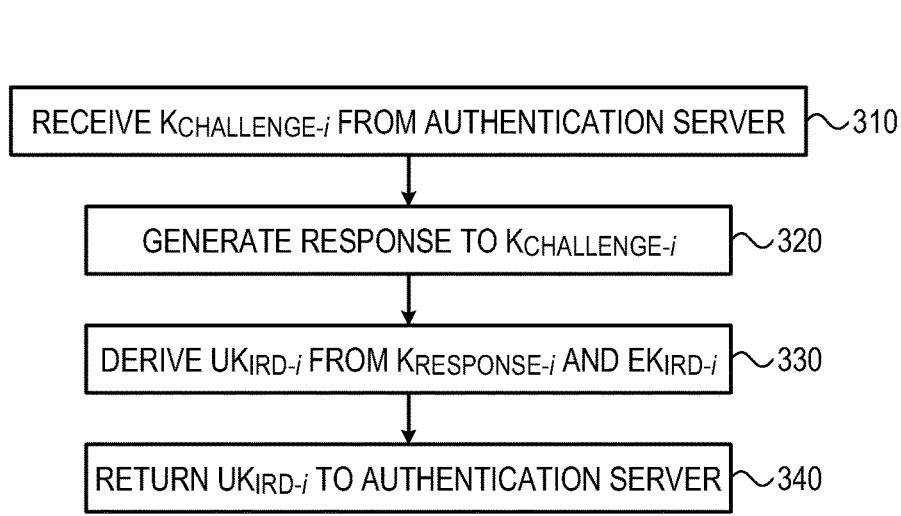
FIG. 3 is a block diagram of a challenge-response process that may be performed by the CE device of FIG. 1.

Reference is now made to FIG. 3 which illustrates a challenge-response process 200 that may be performed by CE device 100 in response to a CHALLENGE received from authentication server 10. The received challenge and its associated i, heretofore referred to as $RK_{CHALLENGE-i}$ and Ri, may be received by I/O module 110 from authentication server 10 as a challenge to authenticate the device ID for CE device 100. It will be appreciated that $RK_{CHALLENGE-i}$ may be one of the series $K_{CHALLENGE-i}$ and Ri may be its associated i. Response generator 150 may generate (step 320) authentication request response $AR_{RESPONSE-i}$ in response to $K_{CHALLENGE-i}$.

Challenge responder 140 may comprise decryption module 145 which may employ a decryption algorithm suitable for decrypting data encrypted by encryption module 125. Challenge responder 140 may employ decryption module 145 to derive (step 330) unencrypted value $UK_{IRD-i}$ by decrypting $EK_{IRD-i}$ with $AR_{RESPONSE-i}$. It will be appreciated that challenge responder 140 may retrieve $EK_{IRD-i}$ from challenge-response pair table 132 per the value received for i from authentication server 10.

I/O module 110 may then return (step 340) $UK_{IRD-i}$ to authentication server 10. It will be appreciated that, assuming that the same response function is used by response generator 150 in both processes 200 and 300, $UK_{IRD-i}$ may equal to $K_{IRD-i}$. Furthermore, as discussed hereinabove, $K_{IRD-i}$ may be derivable according to the authentication data in serial key database 15. Accordingly, authentication server 10 may authenticate CE device 100 by comparing $UK_{IRD-i}$ to $K_{IRD-i}$. If $UK_{IRD-i}$ equals $K_{IRD-i}$, the service provider may provide CE device 100 with services as per any rights associated with its associate device ID. If not, the service provider may refuse to provide services to CE device 100.

In such manner, $K_{IRD-i}$ may effectively serve as a proxy for the actual response to $K_{CHALLENGE-i}$. Even though authentication server 10 may not actually receive $AR_{RESPONSE-i}$ in response to $K_{CHALLENGE-i}$, it will be appreciated that CE device 100 may not be able to return the proxy response $K_{IRD-i}$ without first generating $AR_{RESPONSE-i}$. Accordingly receipt of $K_{IRD-i}$ may be sufficient for authentication server 10 to authenticate CE device 100 per challenge $K_{CHALLENGE-i}$.

It will further be appreciated that the authentication process as described hereinabove may be response agnostic; the service provider may effectively use challenge-response pairs uniquely created for a given CE device without knowing the response function used to create the pairs. In fact, the service provider may not even receive the actual response generated by response generator.

It will similarly be appreciated that the challenge-response pairs stored in challenge-response pair table 132 may not be sufficient in and of themselves to enable a hacker to be falsely authenticated by authentication server 10. Even if challenge-response pairs table 132 may be accessed and read by a hacker, $K_{IRD-i}$ is not stored "in the clear," but rather in its encrypted form, $EK_{IRD-i}$. Since $EK_{IRD-i}$ may not be recognized by authentication server 10, $EK_{IRD-i}$ may only be of value to a hacker if the response function of response generator 150 may be duplicated.

It will also be appreciated that the device manufacturing process may be simplified by generating multiple challenges and responses from meta-keys. The manufacturing process may be further simplified using the same meta-keys for multiple devices. Similarly, meta-key allocation may be in accordance with different sub-groups of the overall population of CE devices 100. In some configurations, $MK_{IRD}$ may even be defined as equivalent to $MK_{CHALLENGE}$; as long as the derivation processes of steps 220 and 225 are not parallel, equivalent meta-keys may not produce identical series $K_{CHALLENGE-i}$ and $K_{IRD-i}$. Any of these methods may be employed singly or in combination to reduce the complexity entailed by the explicit provision of a unique series of authentication challenges and proxy responses for every CE device 100.

It will further be appreciated that other information may be exchanged between CE device 100 and authentication server 10 as part of the authentication process. For example, CE device 100 may also send a copy of device ID 135 to authentication server 10 in addition to $UK_{IRD-i}$.

The inventors of the present invention have realized that the response function agnostic authentication methods described hereinabove may also be implemented to authenticate a receiving device in a broadcast system. In such a system, instead of returning $K_{IRD-i}$ to authentication server 10, it may be used as a key to decrypt encrypted media that may broadcast by the service provider.

Figure 4:
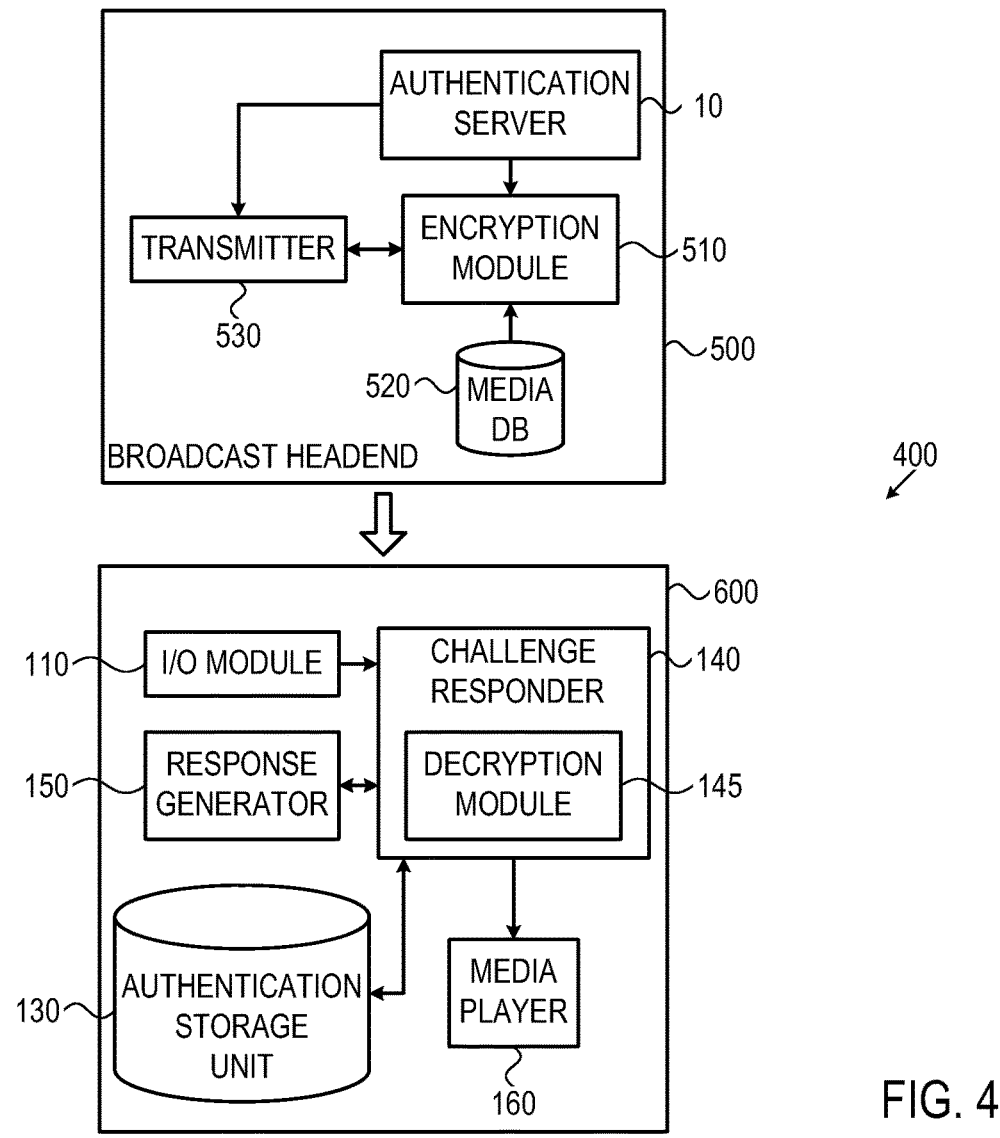
FIG. 4 is a schematic illustration of a response function agnostic, broadcast decryption system, constructed and operative in accordance with an embodiment of the present invention.

Reference is now made to FIG. 4 which illustrates a response function agnostic, broadcast decryption system 400. System 400 may comprise broadcast headend 500 and CE device 600. Server 500 may be configured to broadcast encrypted media to be played on CE device 600. CE device 600 may be similar to CE device 100 in that it may be any suitable device for receiving such a broadcast, such as, but not limited to, a set-top box, personal computer, tablet, handheld communications device and the like. It will be appreciated that broadcast headend 500 may provide such broadcast services to multiple CE devices 600. However, in the interests of clarity, only one CE device 600 may be depicted in FIG. 4.

As with CE device 100, CE device 600 may comprise I/O module 110, response generator 150, authentication storage unit 130, and CHALLENGE responder 140. CE device 600 may employ methods such as, but not limited to, process 200 to generate and store a series of $EK_{IRD-i}$ and associated i in authentication storage unit 130. CE device 600 may also comprise media player 160. Media player 160 may be any suitable functionality suitable for playing media such as that transmitted by broadcast headend 500.

Broadcast headend 500 may comprise authentication server 10, encryption module 510, media database 520 and transmitter 530. Media database 520 may be configured to store media for broadcast via transmitter 530. As described hereinabove, authentication server 10 may be configured to generate $K_{IRD-i}$ associated with CE device 600 for a given i. Encryption module 510 may be configured to encrypt media prior to broadcast.

In operation, encryption module 510 may receive $K_{IRD-i}$ from authentication server 10 and use it to encrypt media received from media database 520 prior to broadcast. Encryption module 510 may use $K_{IRD-i}$ as an encryption key to directly encrypt the media. Alternatively, $K_{IRD-i}$ may serve as an input key for a key ladder function that may derive the actual encryption key to be used by encryption module 510 to encrypt the media. Encryption module 510 may be configured to use any suitable encryption protocol including, for example, AES or DES. Encryption module 510 may forward the now encrypted media to transmitter 530 for broadcast to CE devices 600. It will be appreciated that broadcast headend 500 may comprise other broadcast functionality that in the interests of clarity may not be depicted in FIG. 4.

Authentication server 10 may forward i and its associated $K_{CHALLENGE-i}$ to transmitter 530. Transmitter 530 may be configured to broadcast the encrypted media to CE devices 600 along with i and $K_{CHALLENGE-i}$. It will be appreciated that i and $K_{CHALLENGE-i}$ may be transmitted periodically in order to accommodate an unknown viewing schedule for users of devices 100.

I/O module 110 may receive the encrypted media as well as i and $K_{CHALLENGE-i}$, heretofore referred to as Ri and $RK_{CHALLENGE-i}$ to indicate that they have been received from broadcast headend 500. I/O module 110 may forward Ri and $RK_{CHALLENGE-i}$ to challenge responder 140. Challenge responder 140 may use a process similar, but not limited to, steps 310-330 from process 300 to derive $UK_{IRD-i}$. It will be appreciated that as described hereinabove, $UK_{IRD-i}$ may be equivalent to $K_{IRD-i}$. Accordingly, $UK_{IRD-i}$ may facilitate the decryption of the encrypted media received from transmitter 530. For example, if $K_{IRD-i}$ was used as the encryption key to encrypt the media, $UK_{IRD-i}$ may be used as the decryption key. If $K_{IRD-i}$ was used as input to a key ladder function to derive the encryption key, then $UK_{IRD-i}$ may be input to an identical key ladder function to derive the decryption key.

Accordingly, instead of returning $UK_{IRD-i}$ to authentication server 10 as in step 340 of process 300, challenge responder 140 may employ encryption module 145 to decrypt the encrypted media. The resulting decrypted media may then be suitable for playing on media player 160.

It will be appreciated that in such manner system 400 may provide a response function agnostic solution for the broadcast and receipt of encrypted media. The response function in use on CE device 600 may be unknown to the operator of broadcast headend 500. However, it may still be used to decrypt encrypted broadcasts from broadcast headend 500.

It will also be appreciated that in contrast to process 300, there may be no need to return $UK_{IRD-i}$ to authentication server 10, which may make it more difficult for a hacker to acquire both "pieces" of a challenge pair by intercepting $K_{CHALLENGE-i}$ as it may be received from authentication server 10 and similarly intercepting $UK_{IRD-i}$ as it may be returned to authentication server 10. Acquiring $UK_{IRD-i}$ in such manner may be used to circumvent the need for decryption of $EK_{IRD-i}$. However, in system 400, $UK_{IRD-i}$ may not be returned in the clear, thus providing further protection against such an attack.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. Alternatively or additionally, the software may be stored in tangible, non-transitory computer-readable storage media, such as optical, magnetic, or electronic memory.

It is appreciated that software components of the present invention may, if desired, be implemented in ROM (read only memory) form. The software components may, generally, be implemented in hardware, if desired, using conventional techniques. It is further appreciated that the software components may be instantiated, for example, as a computer program product; on a tangible medium; or as a signal interpretable by an appropriate computer.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A method for generating and storing challenge-response pairs for the authentication of a consumer electronics (CE) device, the method comprising:

sharing at least one challenge $K_{CHALLENGE-i}$ and a series of integers i with a service provider, wherein said CE device is configured to receive a service from said service provider;

sharing at least one proxy response $K_{IRD-i}$ with said service provider, wherein each of said $K_{IRD-i}$ is associated with one of said at least one $K_{CHALLENGE-i}$ according to said series of integers i;

for each said $K_{CHALLENGE-i}$, generating an associated $K_{RESPONSE-i}$ by inputting said $K_{CHALLENGE-i}$ to a response generator associated with said CE device;

producing one of said challenge-response pairs from each said $K_{CHALLENGE-i}$ and its said associated $K_{RESPONSE-i}$, wherein at least one of a response function of said response generator and a parameter required for said response function is withheld from said service provider;

for each of said $K_{RESPONSE-i}$, deriving $EK_{IRD-i}$ from both said $K_{RESPONSE-i}$ and said associated $K_{IRD-i}$; and storing each of said $EK_{IRD-i}$ on said CE device according to said series of integers i, wherein a given said $K_{IRD-i}$ is derivable from said $K_{RESPONSE-i}$ received from said response generator in response to said $K_{CHALLENGE-i}$ paired with said $K_{IRD-i}$ and said $EK_{IRD-i}$ associated with said paired $K_{CHALLENGE-i}$.

2. The method according to claim 1 and also comprising:
deriving said at least one said challenge $K_{CHALLENGE-i}$ from meta-key $MK_{CHALLENGE}$ and said series of integers i, wherein said $MK_{CHALLENGE}$ is shared with said service provider; and
deriving said at least one said proxy response $K_{IRD-i}$ from meta-key $MK_{IRD}$ and said series of integers i, wherein said $MK_{IRD}$ is shared with said service provider.

3. The method according to claim 2 wherein at least one of said meta-key $MK_{CHALLENGE}$ or said meta-key $MK_{IRD}$ is common to more than one said CE device.

4. The method according to claim 2 wherein said meta-key $MK_{CHALLENGE}$ is equal to said $MK_{IRD}$ on said CE device, wherein said deriving said at least one challenge $K_{CHALLENGE-i}$ uses a different algorithm than said deriving said at least one said proxy response $K_{IRD-i}$.

5. The method according to claim 1 wherein said at least one $K_{CHALLENGE-i}$ comprises at least two $K_{CHALLENGE-i}$ and said at least one $K_{IRD-i}$ comprises at least two $K_{IRD-i}$.

6. The method according to claim 1 wherein said storing each of said at least one $EK_{IRD-i}$ comprises storing each of said at least one $EK_{IRD-i}$ in non-volatile memory.

7. The method according to claim 1 wherein said parameter required for said response function is withheld from the manufacturer of said CE device.

8. The method according to claim 1 wherein said response generator either:
uses a key-based computation, wherein the key used in said key-based computation is withheld from said service provider; or
the response generator uses a physically unclonable function (PUF) device.

9. The method according to claim 1 and also comprising:
receiving $RK_{CHALLENGE-i}$ and Ri from said service provider, wherein said $RK_{CHALLENGE-i}$ is equal to one of said at least one $K_{CHALLENGE-i}$ and Ri is equal to one of said series of integers i associated with said one of at least one $K_{CHALLENGE-i}$;
inputting $RK_{CHALLENGE-i}$ to an operation phase response generator;
in response to said inputting, receiving $RK_{RESPONSE-i}$ from said operation phase response generator;
deriving unencrypted $UK_{IRD-i}$ from said $RK_{RESPONSE-i}$ and said $EK_{IRD-i}$, wherein said $EK_{IRD-i}$ is associated with said Ri; and
returning said $UK_{IRD-i}$ to said service provider in response to said $RK_{CHALLENGE-i}$, thereby authenticating said CE device.

10. A method for decrypting media on a consumer electronics (CE) device, the method comprising:
sharing at least one challenge $K_{CHALLENGE-i}$ and a series of integers i with a media provider;
sharing at least one proxy response $K_{IRD-i}$ with said media provider, and wherein each of said at least one $K_{IRD-i}$ is associated with one of said at least one $K_{CHALLENGE-i}$; according to said series of integers i;
for each $K_{CHALLENGE-i}$, generating an associated $K_{RESPONSE-i}$ by inputting said $K_{CHALLENGE-i}$ to an initialization phase response generator associated with said CE device, wherein at least one of a response function for said initialization phase response generator and a parameter required for said response function of said initialization phase response generator is withheld from said media provider;
for each of said associated $K_{RESPONSE-i}$, deriving $EK_{IRD-i}$ from both said associated $K_{RESPONSE-i}$ and said associated $K_{IRD-i}$;
storing each of said $EK_{IRD-i}$ on said CE device according to said series of integers i;
receiving encrypted media, received challenge $RK_{CHALLENGE-i}$ and Ri from said media provider, wherein said $RK_{CHALLENGE-i}$ is equal to one of said at least one $K_{CHALLENGE-i}$ derived from said meta-key $MK_{CHALLENGE}$ and Ri is equal to one of said series of integers i associated with said one of at least one $K_{CHALLENGE-i}$;
generating $RK_{RESPONSE-i}$ by inputting said $RK_{CHALLENGE-i}$ to an operation phase response generator on said CE device, wherein said operation phase generator is configured with the same response function as said initialization phase response generator;
deriving unencrypted $UK_{IRD-i}$ from said $RK_{RESPONSE-i}$ and said $EK_{IRD-i}$, wherein said i associated with $EK_{IRD-i}$ equals Ri; and
using $UK_{IRD-i}$ to decrypt said encrypted media.

11. The method according to claim 10 and also comprising:
deriving said at least one challenge $K_{CHALLENGE-i}$ from meta-key $MK_{CHALLENGE}$ and said series of integers i, wherein said $MK_{CHALLENGE}$ is shared with said service provider; and
deriving said at least one said proxy response $K_{IRD-i}$ from meta-key $MK_{IRD}$ and said series of integers i, wherein said $MK_{IRD}$ is shared with said service provider.

12. The method according to claim 11 wherein at least one of said meta-key $MK_{CHALLENGE}$ or meta-key $MK_{IRD}$ is common to more than one said CE device.

13. The method according to claim 11 wherein said meta-key $MK_{CHALLENGE}$ is equal to said $MK_{IRD}$ on said CE device, wherein said deriving said at least one challenge $K_{CHALLENGE-i}$ uses a different algorithm than said deriving said at least one said proxy response $K_{IRD-i}$.

14. The method according to claim 11 wherein said at least one $K_{CHALLENGE-i}$ comprises at least two $K_{CHALLENGE-i}$ and said at least one $K_{IRD-i}$ comprises at least two $K_{IRD-i}$.

15. The method according to 10 wherein said using comprises: either
decrypting said encrypted media with $UK_{IRD-i}$, wherein said encrypted media is encrypted with said $K_{IRD-i}$ associated with said $K_{CHALLENGE-i}$; or
deriving a decryption key from $UK_{IRD-i}$, wherein said $K_{IRD-i}$ associated with said $K_{CHALLENGE-i}$ was used to secure said encryption key, and decrypting said encrypted media with said encryption key, wherein said encrypted media is encrypted with said encryption key.

16. The method according to 10 wherein said storing each of said at least one $EK_{IRD-i}$ comprises storing each of said at least one $EK_{IRD-i}$ in non-volatile memory.

17. The method according to 10 wherein said parameter required for said response function is withheld from the manufacturer of said CE device.

18. The method according to 10 wherein said response function either:
uses a key-based computation, wherein the key used in said key-based computation is withheld from said service provider; or
uses a physically unclonable function (PUF) device.

19. The method according to 10 and also comprising:

receiving RKCHALLENGE-i and Ri from said service provider, wherein said RKCHALLENGE-i is equal to one of said at least one KCHALLENGE-i and Ri is equal to one of said series of integers i associated with said one of at least one KCHALLENGE-i;

inputting RKCHALLENGE-i to an operation phase response generator; in response to said inputting, receiving RKRESPONSE-i from said operation phase response generator;

deriving unencrypted UKIRD-i from said RKCHALLENGE-i and said EKIRD-i, wherein said EKIRD-i is associated with said Ri; and returning said UKIRD-i to said service provider in response to said RKCHALLENGE-i, thereby authenticating said CE device.

20. An authentication system for a consumer electronics (CE) device comprising:

an authentication storage unit configured to store at least a series of encrypted responses, wherein each of said encrypted responses are derived from a proxy response and an actual response to an authentication challenge from a service provider, wherein said proxy responses and authentication challenges are shared with said service provider;

an I/O module configured to at least receive said authentication challenges and encrypted media from said service provider, wherein said encrypted media is encrypted with one of said proxy responses;

a response function configured to provide said actual responses to said authentication challenges, wherein at least one of said response function and at least one parameter required for said response function is withheld from said service provider; and a challenge responder configured to employ a decryption module to facilitate derivation of said proxy response for an associated received said authentication challenge from said service provider by using said provided actual responses to decrypt said encrypted responses, wherein said decryption module is configured to decrypt said encrypted media using said one of said proxy responses.

21. The authentication system according to claim 20 wherein said authentication system is implemented in a smart card.

22. The authentication system according to claim 20 wherein said I/O module is further configured to return said proxy response to said service provider to authenticate said CE device.

23. The authentication system according to claim 20 wherein:

said I/O module is further configured to receive encrypted media from said service provider;

said encrypted media is encrypted with one of said proxy responses; and said description module is configured to decrypt said encrypted media using said one of said proxy responses.

24. The authentication system according to claim 20 wherein:

said each of series of encrypted responses are associated with a series of i; and said I/O module is further configured to receive one of said series of integers i along with said authentication challenge from said service provider, thereby indicating which of said encrypted responses is associated with a given received said authentication challenge.

* * * * *

UNITED STATES PATENT AND TRADEMARK OFFICE
CERTIFICATE OF CORRECTION

| | |
|---|---|
| PATENT NO. | : 9,847,984 B2 |
| APPLICATION NO. | : 14/773388 |
| DATED | : December 19, 2017 |
| INVENTOR(S) | : David Wachtfogel et al. |

It is certified that error appears in the above-identified patent and that said Letters Patent is hereby corrected as shown below:

On the Title Page

Item (71), Column 1, Lines 1-2, "NDS LIMITED, Staines Middlesex (GB)" to read as -- Cisco Technology Inc., San Jose, CA (US) --.

In the Specification

Column 8, Line 29, "challenge-response" to read as -- Challenge-response --.
Column 9, Line 37, "CHALLENGE" to read as -- challenge --.
Column 11, Line 3, "CHALLENGE responder" to read as -- Challenge responder --.

In the Claims

Column 12, Line 64, in Claim 1, "$EK_{IRD-i}$," to read as -- $EK_{IRD-i}$ --.
Column 13, Line 62, in Claim 10, "$K_{CHALLENGE-i}$;" to read as -- $K_{CHALLENGE-i}$ --.
Column 14, Line 46, in Claim 15, "10" to read as -- claim 10 --.
Column 14, Line 56, in Claim 16, "10" to read as -- claim 10 --.
Column 14, Line 59, in Claim 17, "10" to read as -- claim 10 --.
Column 14, Line 62, in Claim 18, "10" to read as -- claim 10 --.
Column 15, Line 1, in Claim 19, "10" to read as -- claim 10 --.
Column 15, Line 2, in Claim 19, "RKCHALLENGE-i" to read as -- $RK_{CHALLENGE-i}$ --.
Column 15, Line 3, in Claim 19, "RKCHALLENGE-i" to read as -- $RK_{CHALLENGE-i}$ --.
Column 15, Line 4, in Claim 19, "KCHALLENGE-i" to read as -- $K_{CHALLENGE-i}$ --.
Column 15, Line 6, in Claim 19, "KCHALLENGE-i" to read as -- $K_{CHALLENGE-i}$ --.
Column 15, Line 7, in Claim 19, "RKCHALLENGE-i" to read as -- $RK_{CHALLENGE-i}$ --.
Column 15, Line 9, in Claim 19, "RKRESPONSE-i" to read as -- $RK_{RESPONSE-i}$ --.
Column 15, Line 11, in Claim 19, "UKIRD-i" to read as -- $UK_{IRD-i}$ --.
Column 15, Lines 11-12, in Claim 19, "RKCHALLENGE-i" to read as -- $RK_{RESPONSE-i}$ --.
Column 15, Line 12, in Claim 19, "EKIRD-i" to read as -- $EK_{IRD-i}$ --.
Column 15, Line 12, in Claim 19, "EKIRD-i" to read as -- $EK_{IRD-i}$ --.

Signed and Sealed this
Third Day of April, 2018

Andrei Iancu
*Director of the United States Patent and Trademark Office*

CERTIFICATE OF CORRECTION (continued)
U.S. Pat. No. 9,847,984 B2

Column 15, Line 14, in Claim 19, "UKIRD-i" to read as -- $UK_{IRD-i}$ --.
Column 15, Line 15, in Claim 19, "RKCHALLENGE-i" to read as -- $RK_{CHALLENGE-i}$ --.
Column 16, Line 22, in Claim 23, "description" to read as -- decryption --.